United States Patent [19]
Onarheim et al.

[11] 3,769,900
[45] Nov. 6, 1973

[54] PROCESSING OF ANIMAL MATERIAL COMPOSITIONS

[75] Inventors: Thor Onarheim, Hop; Per Solberg, Bergen, both of Norway

[73] Assignee: Stord Bartz Industry A/S, Bergen, Norway

[22] Filed: Apr. 21, 1971

[21] Appl. No.: 135,969

[52] U.S. Cl. .................................. 99/348, 259/109
[51] Int. Cl. .............................................. B01f 7/02
[58] Field of Search...................... 99/249, 250, 251, 99/216, 324, 235, 234, 348, 403, 407; 23/290

[56] References Cited
UNITED STATES PATENTS
| | | | |
|---|---|---|---|
| 2,549,216 | 4/1951 | Martin | 99/249 |
| 2,650,807 | 9/1953 | Bilek | 99/251 |
| 3,641,917 | 2/1972 | Vallee | 99/251 |

Primary Examiner—Robert W. Jenkins
Attorney—Watson, Leavenworth & Kelton

[57] ABSTRACT

The invention has reference to a process and apparatus for the batch sterilisation and evaporation of a water-containing animal material composition which involves leading the composition between an inner rotating heating surface and an outer stationary surface, the former representing a far larger proportion of the total heating area than the latter. After an initial heating, the composition has its passage arrested by rotating the inner surface in the reverse direction when substantial stirring is brought about and sterilisation and evaporation of the composition are effected. Finally, the composition which remains is expelled by rotating the inner heating surface in the original direction.

4 Claims, 6 Drawing Figures

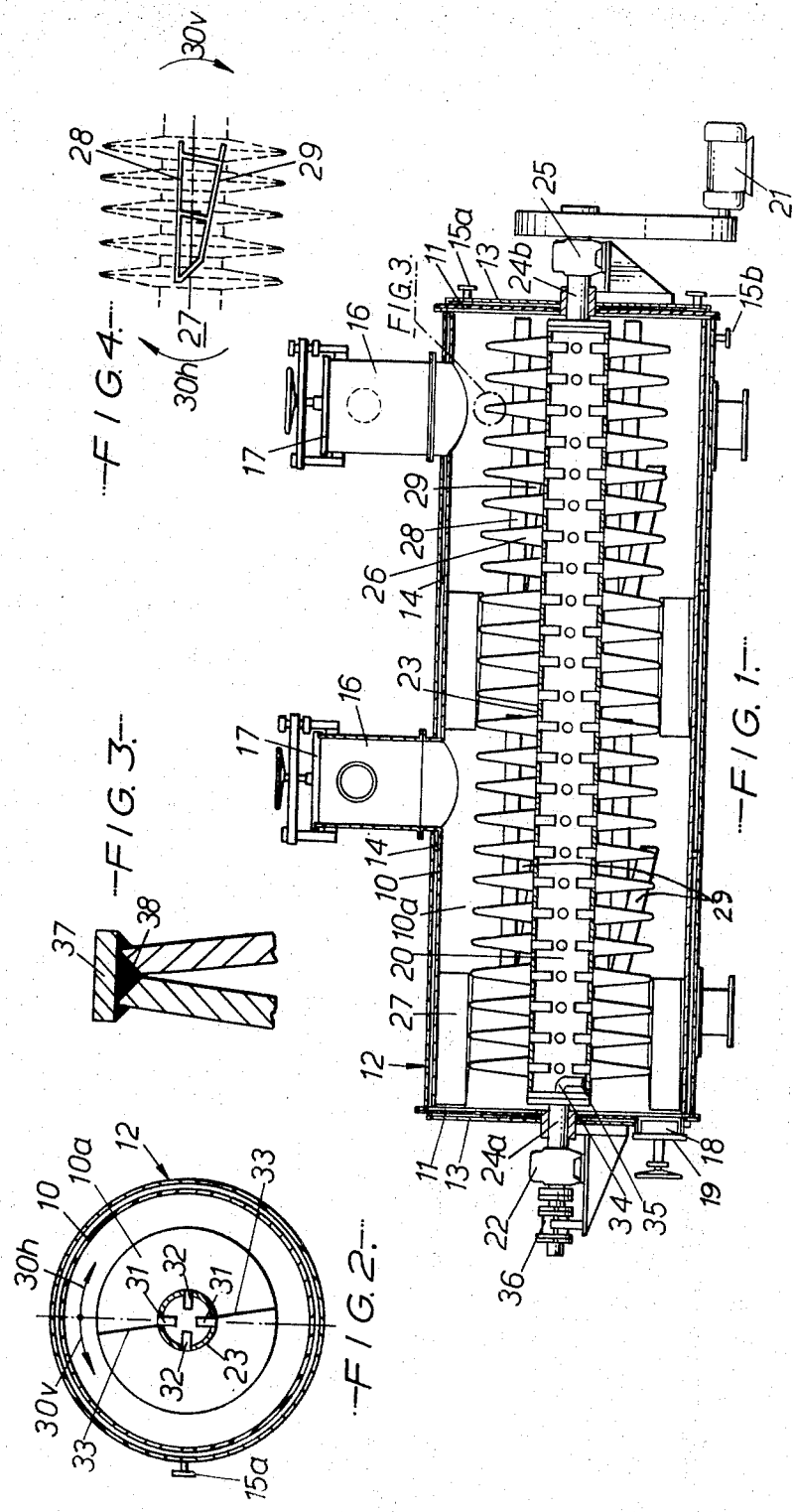

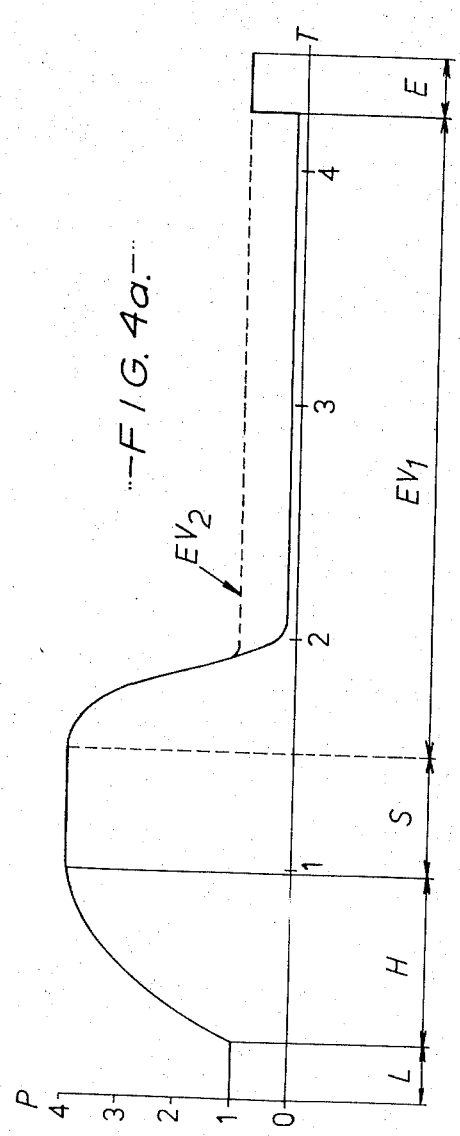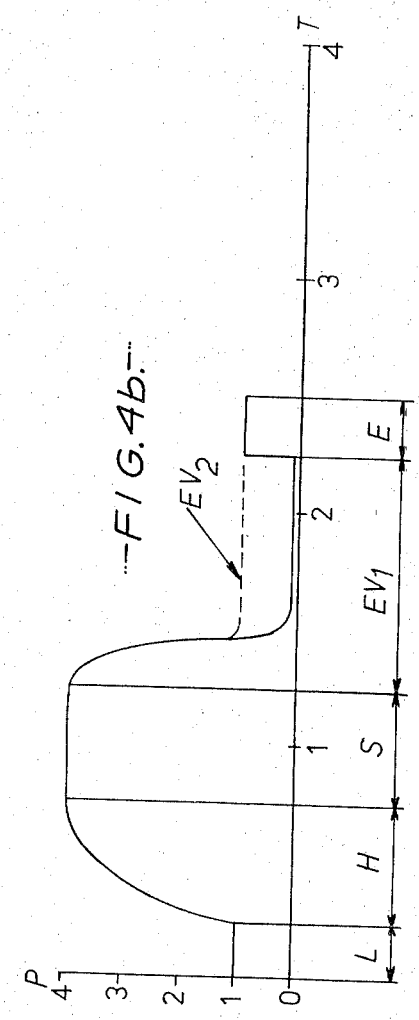

PROCESSING OF ANIMAL MATERIAL COMPOSITIONS

This invention relates to the processing of animal material compositions.

As regards the working-up of animal material compositions, for example butcher's offal and fish raw material into meal and oil, greater and greater emphasis must constantly be placed on arriving at production processes which give the best and the cheapest possible product.

The main apparatus in such a process which has a big application practically is a pressure cooker for the charge-wise or batch treatment of the raw material. In the pressure cooker, heating occurs for the sterilisation of the material, after which evaporation of the water occurs in the same cooker, either at atmospheric pressure or under vacuum by connecting the cooker to a vacuum system.

The cookers which have hitherto been used for the batch or charge-wise sterilisation and evaporation of animal material compositions, consist of a stationary, approximately horizontal material chamber which is surrounded by a steam jacket and steam-heated end gables. This chamber includes a rotating body consisting of a rotor pipe having arms and vanes for stirring and conveying the mass. Rotor pipes, arms and in some cases also vanes can be steam-conducting in order to obtain the largest possible heating surface. All the vanes are designed similarly unsymmetrical, so that in the rotor's one direction of rotation they give an axial forward feeding of the material in the one direction, while in the other direction of rotation of the rotor they have a neutral position, so that no forward feeding occurs.

It is normal to fill a pressure cooker of the aforementioned type with material, so that during the evaporation period it is approximately half full. The evaporation time for drying down to about 5 percent water in the final product tkaes 2½ to 3 hours in the cooker.

Investigations have shown that such a long maintenance time in the pressure cooker leads for one thing to the formation of so-called "Schutz colloids" which in the form of small particles envelop and accompany the fat. To some extent, poor quality fat finds its cause in a long evaporation process. It is also a known fact that a long maintenance time under high temperature is disadvantageous for the feeding value of the meal.

In order to avoid the long maintenance time under high temperature, there has been proposed a combination of a separate pre-cooker and a subsequent drying chamber. By this combination, it has been possible to reduce the disadvantageous effect on fat and meal quality by shortening the combined maintenance time of the process. The reduction of the maintenance time of the process is achieved by being able to design the pre-cooker and drying apparatus specially for the purpose.

A disadvantage of the known combination of separate pre-cooker and subsequent drying apparatus is that the pre-cooker and the drying apparatus each demand space and are complicated. It is, furthermore, usual to utilise charge-wise operation of the pre-cooker and in order to obtain effective employment of the drying apparatus, it is normal to have a continuously operating drying apparatus, something which in practice will require an intermediate collecting container between the pre-cooker and drying apparatus together with further complicated equipment.

With the present invention the aim is to be able to carry out the whole sterilisation and evaporation process in one and the same apparatus, while at the same time being able to reduce the maintenance time of the process to a very substantial degree.

With the hitherto most usual pressure cookers, in which the all essential portion of the heating surface lies in the cylindrical container and in which the rotor represents an immaterial portion of the heating surface, the ratio between the heating surface and the net container volume is very unfavourable with increasing container diameters. The only solution has been then to increase the length of the container but constructive limitations as to the length of the apparatuses which can be built are soon run into. In practice, the existing pressure cookers are built so that the ratio between the heating surface measured in $m^2$ and the net container volume measured in $m^3$ lies in the region of 3:1 for a large cooker and 5:1 for a small cooker.

With the present invention, the aim is a solution in which the intended favourable reduction in maintenance time can be achieved independently of the size of the apparatus. According to the invention, special aim is taken to obtain an effective handling of the animal material in the container and specially an effective heat transfer to the material with the relatively large heating surfaces of the container.

According to the present invention a process for the batch sterilisation and evaporation of a water-containing animal material composition comprises leading the composition through a space defined between inner and outer heating surfaces by rotating the former in a given direction, said inner surface representing a far larger proportion of the total heating area than the outer heating surface which is stationary, arresting the passage of the composition by rotating said inner surface in the reverse direction thereby bringing about substantial stirring of the composition and subjecting the latter to sterilisation and evaporation prior to expelling the remaining material from said space by rotating the inner heating surface in the original direction of rotation.

Also according to the invention is an apparatus for carrying out the process of the last-preceding paragraph which comprises a stationary cylindrical container having an inlet and an outlet and an external jacket for conducting heat medium, a cylinder for conducting heat medium mounted for rotation in either direction within said container and defining with the walls of the latter a space for the passage of the animal material composition, said cylinder communicating with a series of annular disc-shaped hollow elements arranged essentially perpendicularly thereon and connected to an outwardly projecting system of vanes, said vane system comprising pairs of vane members following immediately after each other and consisting of a first member extending obliquely of and a second member extending substantially parallel to the longitudinal axis of the cylinder, the ratio between the combined heating surfaces of the container and cylinder measured in $m^2$ and the net volume of the container measured in $m^3$ being at least 8:1 for a large apparatus and at least 10:1 for a small apparatus with the radial dimension of the annular cross-section between the peripheries of the hollow elements and the walls of the container being from one-fifth to one-sixth of the internal diameter of the container and the apparatus being such that rotation of the cylinder in one direction causes the compostion to be urged longitudinally thereof and rotation in the reverse direction causes substantial stirring of the latter without said longitudinal movement.

Further according to the invention is a method of batch sterilising and evaporating the animal material composition using the apparatus of the last-preceding paragraph which comprises introducing the composition through the inlet while rotating the heat medium-conducting cylinder in a given direction to cause the vane system to urge said composition longitudinally of the container, reversing the direction of rotation of the cylinder and sterilising and evaporating said composition and on completion thereof, rotating said cylinder in the original direction to expel the remaining material from the outlet.

As a consequence of the powerful movement obtained of the animal material in the container together with the high specific evaporation a rotating heating surface gives, there is achieved, according to the invention, the reduction of the otherwise customary processing time of 2½ to 3 hours down to less than one hour's processing time, on processing in one and the same container.

In order that the invention can be more clearly understood, convenient embodiments thereof will now be described, by way of example, with reference to the accompanying drawings in which:

FIG. 1 is a longitudinal section through an apparatus according to the invention, FIG. 2 is a cross-section through the apparatus of FIG. 1, FIG. 3 is a cross-section of a detail of the heating body, FIG. 4 is another detail of the heating body illustrated in full lines with portions of the heating body drawn in dotted lines.

FIGS. 4a and 4b are graphs in which cycle time measured in hours (abscissa) is plotted against absolute pressure measured in atmospheres (ordinate).

The illustrated apparatus is designed as a combined pressure cooker and dryer and is provided with a stationary, approximately cylindrical housing 10 which together with two end gables 11 forms the material chamber 10a of the cooker which on the cylindrical portion is surrounded by a steam jacket 12 for heating the inner walls of the housing 10 and on the two end gables 11 is surrounded by an outer end gable 13 for heating of the inner end gables 11. The heating of the inner walls of the housing 10 and the end gables 11 has for its object to supply heat to the material chamber of the cooker. The steam jacket 12 can be divided up into sections by means of partition walls in a known manner. These sections and end gables are supplied with steam and emptied of condensate in a known way through connections 15a and 15b.

In the illustrated embodiment the housing is provided at the top, as well as at its one end just away from the centre, with two similar intakes 16 for chargewise loading of material into the material chamber 10a of the cooker. Both intakes are equipped with readily detachable covers 17. At the opposite end of the housing, in the lowermost region of the end gable 11, the material chamber is provided with a discharge opening for material 18 and the discharge opening is equipped with a readily detachable cover 19.

For smaller sizes of apparatus one intake 16 is sufficient and is then placed at the opposite end of the cooker relative to the discharge opening 19.

In FIG. 1 and 2, there is shown a rotating heating body 20. the heating body is driven in a manner known per se by motor power, generally designated at 21, via a suitable transmission. The heating body is provided with a hollow shaft journal 24a, the one end of which is mounted in a bearing 22 at the one end of the housing and the other end of which is fixed to a hollow cylinder 23 which extends the whole length of the housing 10. At the other end of the housing, the cylinder 23 is fixed to another shaft journal 24b which also constitutes the drive shaft and which is mounted in a bearing 25.

On the external cylinder surface of the hollow cylinder 23, there are welded a series of hollow disc-shaped elements 26. These elements can be made by placing together two round plates of slightly conical form and having a central opening with the two concave sides disposed towards each other and thereafter welded together along the periphery, and by welding at their circular, central opening to the cylinder wall and the hollow cylinder 23. In essence the construction of the hollow elements 26 corresponds to that which is described in Norwegian Pat. No. 95,490.

A differing feature in relation to Norweigan Pat. No. 95,490 is evident from FIG. 3, which shows a detail of the periphery of the annular element 26. Along the outer edge of the annular element is welded on a hollow flat bar of steel 37 so as to protect the weld 38 and the outer edge against wear.

It is evident that the peripheries of the hollow elements 26 do not project completely out to the inner-walls of the housing 10, and that the mass which is received in the drying chamber can pass, during the loading period as well as during the emptying period, through the outer free annular cross-section which is present between the inner walls of the housing 10 and the peripheries of the annular disc-shaped elements 26. The radial dimension of this annular cross-section can lie between about one-fifth and one-sixth of the internal diameter of the housing, dependent on the internal diameter of the cooker.

To the peripheries of the hollow elements 26 there is welded a vane system 27, which is shown further in detail in FIG. 4 and which in the axial direction of the housing crosses one or more annular disc-shaped hollow elements 26. This vane system consists of a straight vane 28, the plane of which is at right angles to the direction of rotation 30h, said vane extending substantially parallel to the longitudinal axis of cylinder 23, and a vane 29 which can either be rectilinear or can have a broken line and the main plane of which forms a definite angle with the direction of rotation 30v and the longitudinal axis of the hollow cylinder. Further, vane 29 extends oblique to the axis of cylinder 23. The directions of rotation 30h and 30v are shown in FIG. 2. The direction of rotation 30v is utilised for the loading as well as for the emptying operation, the material then being given, by vitrue of the oblique position of the vane 29, a movement in the axial direction of the housing. In other words, due to the vane system being disposed helically along the cylinder with a degree of overlapping between successive pairs of vane members 28, 29, there is effected axial displacement of the material from right to left as seen in FIG. 1 when the vanes and cylinder 23 rotate in the direction 30V. Due to the fact that two intake openings 16 are arranged on the housing as shown in FIG. 1, the material only needs to be conveyed half the length of the housing during loading. The direction of rotation 30h is utilised during the sterilisation and evaporation operations, the vane system then not causing any forward feeding. This vane system has a disposition around the disc-shaped elements 26 according to a definite pattern, for example in a helical line in the longitudinal direction of the cooker and with a certain overlapping in the longitudinal direction between two successive vane units. During the sterilisation and evaporation opeations the material is subjected to an extensive stirring effect.

Each of the hollow disc-shaped elements 26 are supplied with steam and are emptied of condensate by a principle corresponding to that of Norwegian Pat. No. 95,490. By virtue of the substantially larger quantity of steam which is to be supplied and condensate which is to be removed with a charge-wise working pressure cooker according to the invention than in the case with a continuously operating dryer according to Norwegian Pat. No. 95,490, individual details of the system must be adapted for the invention.

As shown in FIG. 2, there are bored out for each hollow element 26 on the hollow cylinder 23 one or more pairs of holes (in FIG. 2 are shown two pairs of holes) disposed around the periphery of the hollow cylinder 23. In these holes are welded in, a corresponding number of pipe taps 31 and 32 which have a length about one-third of the external diameter of the hollow cylinder 23. Between the two pipe taps 32 and 31, reckoned in the direction of rotation 30h, there is welded in a partition plate 33 close up to 31 in the hollow space which the disc-shaped elements 26 form.

It is further evident from FIG. 2 that when steam is supplied through the hollow cylinder 23, the steam distributes itself through the pipe taps 31 and 32 to each of the interiors of the disc-shaped elements 26. Furthermore, it will be evident that when the heating body 20 rotates in the direction of rotation 30h, the steam condensate will be taken along by the partition plate 33 and thereafter emptied out through the pipe tap 31. At the same time, the pipe taps 31 and 32 will prevent the condensate which is emptied into the hollow cylinder 23 from draining back to the interiors of the hollow elements because the pipe taps 31 and 32 project well above the level of the condensate in the cylinder 23.

The condensate which collects in the bottom of the cylinder 23 is tapped out through a U-shaped pipe 34 which extends out through the hollow shaft journal 24a. A branch 35 of this condensate drawing-off pipe 34 extends down to the bottom of the hollow cylinder 23.

Steam is fed to the hollow shaft journal 24a through a stationary steam box 36 having a spherical rotating, pressure discharge sealing means.

It is evident from the above that by designing the heating body with tightly following hollow elements 26, a very large proportion of the combined heating surface of the apparatus has been distributed on the heating body 20, something which makes possible the stated high ratio between heating surface and chamber volume. At the same time, it is evident that the design of the rotating heating body and the employment of the illustrated vane system provides a good movement of the mass of material during the sterilisation and evaporation operation, as well as a relatively strong movement between the material and the heating surfaces, whereby there is obtained an especially effective heat transfer and thereby a correspondingly reduced maintenance time for the material in the cooker during the course of the process. Independently of the powerful stirring effect which is achieved during the sterilisation and evaporation operation, there is obtained during loading and drawing off an effective feeding of the material in an axial direction through the apparatus.

The invention will now be illustrated with reference to the following example:

EXAMPLE

With reference to the drawings, there are shown typical time cycles for the treatment of six tons of charge, that is to say in FIG. 4a by a pressure cooker of known construction and in FIG. 4b by a pressure cooker according to the invention.

The meanings of the various symbols appearing on FIGS. 4a and 4b are as follows:

P — atmos, absolute pressure
L — loading
H — heating
S — sterilisation
$EV_1$ — evaporation of water
$EV_2$ — evaporation of water at atmospheric pressure by an alternative process
E — emptying
T — processing time in hours.

It should be observed that the requirements for sterilisation time and sterilisation temperature, especially as regards butcher's offal, can vary for the different countries, while in certain countries there are no specific demands for sterilisation. For this reason the pressure cooker must be able to be regulated so that the treatment can be effected according to the prevailing regulations in each individual instance and in each individual country. Reference is made to a typical process cycle for a pressure cooker accoridng to the known construction and according to the invention in Table 1 below.

TABLE 1

| | Cycle times | |
|---|---|---|
| | Known construction according to FIG. 4a | Construction according to the invention, FIG. 4b |
| 1. Loading of the cooker | 15 min. | 15 min. |
| 2. Heating of the material to 142°C. (4 atmos. absolute pressure) | 43 min. | 30 min. |
| 3. Sterilisation, that is to say each particle guaranteed heated to the sterilisation temperature | 32 min. | 30 min. |
| 4. Evaporation of water at atmospheric pressure or under vacuum, max. 150 mm Hg (absolute pressure) | 165 min. | 60 min. |
| 5. Emptying of the cooker | 15 min. | 15 min. |

From the table it will be evident that according to the invention there was first and foremost a reduction of the time for evaporating the water, namely of about 64 percent of that which has been customary with a knwon construction. Correspondingly the total process cycle was reduced by the solution according to the invention by about 44 percent relative to the total process cycle by the solution according to the known construction.

It shall be added that the material which was loaded into the cooker varied both with regard to the composition and with regard to the degree of dividing up. Before the material was fed to the cooker, there was carried out a breaking up of the larger pieces of material. A typical particle size of material which was fed to the cookers as compared above, had the following dimensions, measured in terms of length, breadth and height respectively: 100 mm × 20 mm × 12 mm.

As typical examples of the types of material which were treated shall be mentioned:

a. Usual butcher's offal, that is to say bones and meat residues.
b. Entrails from animals.
c. Meat, that is to say whole animals.
d. Mixtures of a) and b), b) and c) or a), b) and c).
e. Feathers.
f. Blood.
g. Fish waste.

On working up the material which included bones, it was ensured that the proportion of bones constituted a maximum of 25 percent, for example in a mixture according to example d) above. It is apparent that the fat content as well as the water content in the raw material necessarily varies dependent upon the composition of the material of the charge.

An analysis performed on the raw material of the charges as described above, which constitute typical average charges, gave the following results:

| | |
|---|---|
| Water content | 55% |
| Fat content | 17% |
| Dry material content | 28% |

A corresponding analysis of the final evaporated material gave the following results:

| | |
|---|---|
| Water content | 6.7% |
| Fat content | 35.3% |
| Dry material content | 58.0% |

Generally it is desirable to maintain the water content of the final evaporated material to 5–8 percent.

In the following Tables II and III some main data appear for the three different cooker sizes in respect of a cooker of known construction and a cooker according to the invention:

TABLE II
Main Data for Existing Pressure Cookers

| | | | |
|---|---|---|---|
| Charge size (tons) | 3 | 6 | 15 |
| Net volume (m³) | 5 | 8.5 | 31 |
| Total heating surface (m²) | 28 | 43 | 96 |
| Ratio: Heating surface (m²)/Net volume (m³) | 5.5:1 | 5:1 | 3:1 |

TABLE III
Main Data for Pressure Cookers According to the Present Invention

| | | | |
|---|---|---|---|
| Charge size (tons) | 3 | 6 | 15 |
| Net volume (m³) | 5 | 8.5 | 21 |
| Total heating surface (m²) | 50 | 75 | 170 |
| Ratio: Heating surface (m²)/Net volume (m³) | 10:1 | 9:1 | 8:1 |

What we claim is:

1. An apparatus for the batch sterilisation and evaporation of a water-containing animal material composition which comprises a stationary cylindrical container having an inlet and an outlet and an external jacket for conducting heat medium, a cylinder for conducting heat medium mounted for rotation in either direction within said container and defining with the walls of the latter a space for the passage of the animal material composition, said cylinder communicating with a series of annular disc-shaped hollow elements arranged essentially perpendicularly thereon and connected to an outwardly projecting system of vanes, said vane system comprising pairs of vane members following immediately after each other and consisting of a first member extending obliquely of and a second member extending substantially parallel to the longitudinal axis of the cylinder, the ratio between the combined heating surfaces of the container and cylinder measured in m² and the net volume of the container measured in m³ being at least 8 : 1 for a large apparatus and at least 10 : 1 for a small apparatus with the radial dimension of the annular cross-section between the peripheries of the hollow elements and the walls of the container being from one-fifth to one-sixth of the internal diameter of the container and the apparatus being such that rotation of the cylinder in one direction causes the composition to be urged longitudinally thereof and rotation in the reverse direction causes substantial stirring of the latter without said longitudinal movement.

2. An apparatus according to claim 1, wherein the vane system is disposed helically along the cylinder with a degree of overlapping between successive pairs of vane members.

3. An apparatus according to claim 1, wherein the cylinder includes means for enabling condensed heat medium to be withdrawn therefrom.

4. An apparatus according to claim 3, wherein at least one pair of diametrically opposed holes are formed around the periphery of the cylinder for each of the hollow elements and a corresponding number of pipes for distributing heat medium having a length about one-third of the external diameter of the cylinder are secured therein so as to project well above the level of the heat medium condensate formed in the cylinder when the apparatus is in use and a partition member is located in close proximity to said one pair of pipes in the space formed by the hollow elements to enable said condensate to be emptied out through said one pair of pipes into the cylinder when the latter is rotated in said reverse direction.

* * * * *